Oct. 2, 1956     F. V. GARD     2,764,818
CENTER POINT MEASURE
Filed April 14, 1955
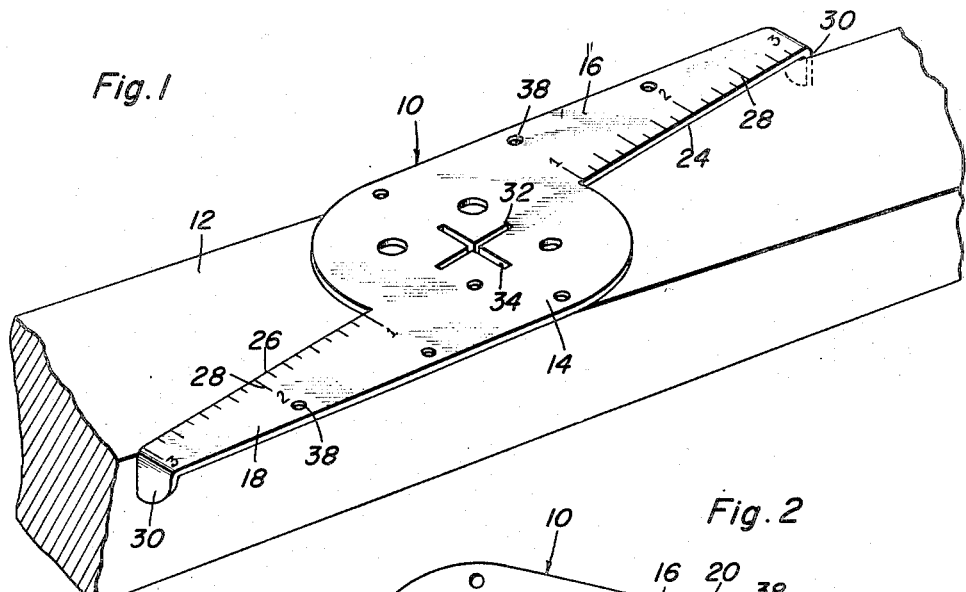
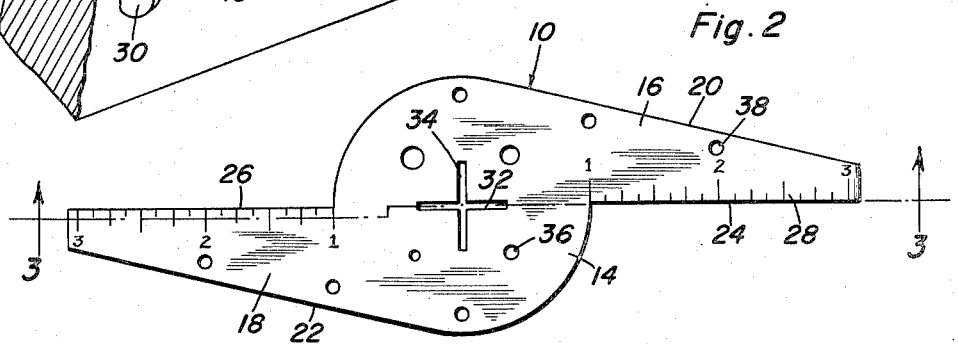
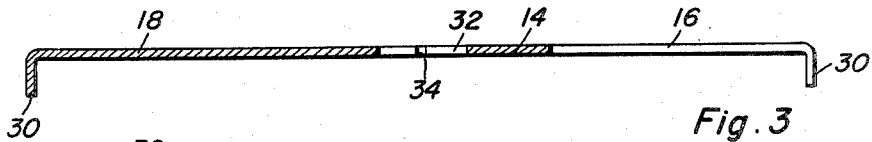
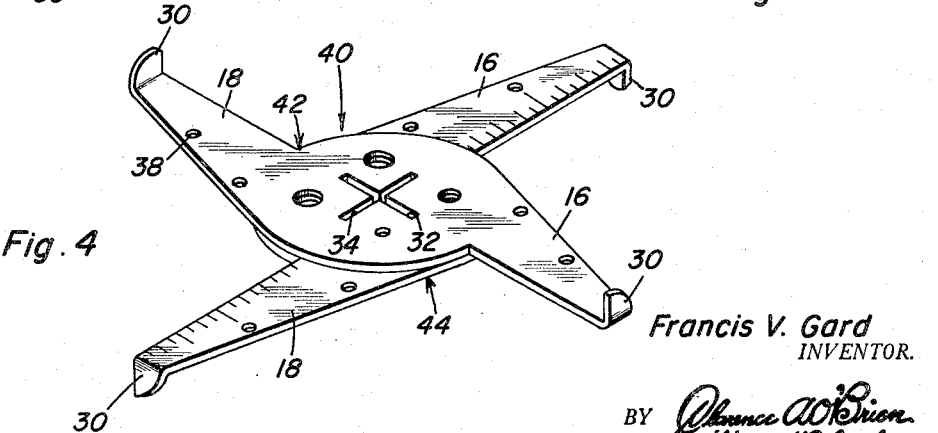
Francis V. Gard
INVENTOR.
BY *Clarence A. O'Brien*
*and Harvey B. Jackson*
Attorneys

United States Patent Office 2,764,818
Patented Oct. 2, 1956

2,764,818

CENTER POINT MEASURE

Francis V. Gard, Springfield, Ill.

Application April 14, 1955, Serial No. 501,355

4 Claims. (Cl. 33—189)

This invention generally relates to a measuring device and more specifically provides novel and improved structures in that class of measuring instruments utilized for determining the center of a piece of material or an article.

An object of the present invention is to provide a center point measuring device for accurately and quickly determining the geometric center of an object such as a piece of lumber or the like, although it will be understood that the device may be utilized for determining the center point of various types of objects.

A further object of the present invention is to provide a center point measuring device for use in conjunction with a scribing instrument wherein the measure is provided with intersecting slots which determines the center point of the object being measured.

Yet another object of the present invention is to provide a center point measure conformable to the preceding objects which is extremely simple in construction, easy to use by persons employed in various trades, accurate in operation, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the center point measure of the present invention in use on an object for determining the center point thereof;

Figure 2 is a top plan view of the center point measure of the present invention;

Figure 3 is a longitudinal, vertical sectional view taken substantially upon a plane passing along section line 3—3 of Figure 2 showing the details of construction thereof; and Figure 4 is a perspective view of a modified form of the center point measuring device of the present invention utilizing a pair of identical members disposed with an opposing and perpendicular relation thereby providing a universally adaptable center point measure.

Referring now specifically to the drawings, it will be seen that the numeral 10 generally designates the center point measure of the present invention for use in measuring the lateral center line or median line of an object such as a piece of lumber 12.

The center point measure 10 generally includes a centrally disposed body portion 14 which is generally circular in lateral cross-section and includes a pair of opposed arms 16 and 18 extending radially therefrom on opposite sides of the body portion 14. The arms 16 and 18 generally taper with the outer edge 20 and 22 respectively being inclined and forming generally a tangent line to the point of intersection between the arms 16 and 18 and the central body portion 14, respectively. The inner edges 24 and 26 of the arms 16 and 18 are straight and form diametrical extensions of the diameter of the body portion 14 wherein the edges 24 and 26 lie along a common longitudinal axis. The surface of the arms 16 and 18 adjacent the edges 24 and 26 is provided with numerical measuring indicia 28 for determining distances as desired.

The outer ends of each of the arms 16 and 18 are provided with downturned perpendicular extensions or tabs 30 for engaging the edges of the piece of material 12. Disposed centrally in the main body 14 are a longitudinal slot 32 and a transverse slot 34 disposed in perpendicular relation, with the longitudinal slot 32 lying along the common axis of the edges 24 and 26 of the arms 16 and 18. By disposing the body 14 and the arms 16 and 18 on the surface of the piece of material 12 with the depending extensions 30 engaging the edges thereof, the center of the material 12 may be determined by making marks in the slots 32 and 34 and the intersection of these marks and the intersection of the slots 32 and 34 will be the lateral center point of the piece of material 12. A plurality of various sized apertures 36 are disposed in the body 14 for determining drill sizes and apertures 38 are provided in the arms 16 and 18 for scribing various radius lines on a piece of material as desired.

As illustrated in Figure 4, a modified form of the invention is illustrated and designated by the numeral 40 and includes two center point measures 42 and 44 which are identical to the center point measure 10 and these members are disposed in back to back relation and perpendicular relation with the right angular slots 32 and 34 overlying each other whereby the center point measure 40 may be utilized in any direction thereby forming a universally usable device.

It will be understood that the device of the present invention may be constructed of any suitable materials and forms an easily and efficiently used center point measuring device for use by various tradesmen such as carpenters, machinists or the like wherein it is sometimes desirable to quickly and easily locate the center point or median line of a piece of material in order to perform work thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A center point measure comprising a central body, a pair of arms projecting outwardly from said body and being disposed in the same plane, an offset extension at the outer end of each arm, said extensions being generally disposed at right angles to said arms, said body having a pair of intersecting slots centrally positioned therein for receiving a scribing instrument, said extensions being adapted to engage opposite edges of a piece of material whereby the center of the material is determined by the point of intersection of said slots.

2. A center point measure comprising a central body, a pair of arms projecting outwardly from said body and being disposed in the same plane, an offset extension at the outer end of each arm, said extensions being generally disposed at right angles to said arms, said body having a pair of intersecting slots centrally positioned therein for receiving a scribing instrument, said extensions being adapted to engage opposite edges of a piece of material whereby the center of the material is determined by the point of intersection of said slots, one edge of each arm and one of said slots being disposed on a common longitudinal axis with the arms being disposed on opposite sides thereof.

3. A center point measure comprising a central body, a pair of arms projecting outwardly from said body and being disposed in the same plane, an offset extension at the outer end of each arm, said extensions being generally disposed at right angles to said arms, said body having a pair of intersecting slots centrally positioned therein for receiving a scribing instrument, said extensions being adapted to engage opposite edges of a piece of material whereby the center of the material is determined by the point of intersection of said slots, each of said arms being provided with measuring indicia and apertures for receiving a scribing instrument for marking indicia on the material being measured.

4. A center point measure comprising a central body, a pair of arms projecting outwardly from said body and being disposed in the same plane, an offset extension at the outer end of each arm, said extensions being generally disposed at right angles to said arms, said body having a pair of intersecting slots centrally positioned therein for receiving a scribing instrument, said extensions being adapted to engage opposite edges of a piece of material whereby the center of the material is determined by the point of intersection of said slots, and an identical body with a pair of arms secured to the upper surface of the body in perpendicular relation thereto, perpendicular extensions on ends of the identical arms extending oppositely from the right angular extensions, said identical body having intersecting slots therein overlying the slots in the body for determining the center of material being measured.

References Cited in the file of this patent

UNITED STATES PATENTS

| | | |
|---|---|---|
| D. 140,152 | Aichele | Jan. 30, 1945 |
| 1,166,968 | Carter | Jan. 4, 1916 |
| 1,665,898 | Strickland | Apr. 10, 1928 |
| 2,333,134 | Whitlock | Nov. 2, 1943 |